(12) United States Patent
Boesman et al.

(10) Patent No.: US 6,777,081 B2
(45) Date of Patent: Aug. 17, 2004

(54) REINFORCING STRUCTURE FOR STIFF COMPOSITE ARTICLES

(75) Inventors: Peter Boesman, Merelbeke (BE); Elsie De Clercq, Zottegem (BE); Frans Van Giel, Kortijk (BE)

(73) Assignee: N.V. Bekaert S.A., Zwevegem (BE)

(*) Notice: Subject to any disclaimer, the term of this patent is extended or adjusted under 35 U.S.C. 154(b) by 29 days.

(21) Appl. No.: 10/149,595

(22) PCT Filed: Dec. 13, 2000

(86) PCT No.: PCT/EP00/12781
§ 371 (c)(1),
(2), (4) Date: Jun. 14, 2002

(87) PCT Pub. No.: WO01/43952
PCT Pub. Date: Jun. 21, 2001

(65) Prior Publication Data
US 2003/0008126 A1 Jan. 9, 2003

(30) Foreign Application Priority Data

Dec. 15, 1999 (EP) .............................. 99024339
Dec. 15, 1999 (EP) .............................. 99204338
Dec. 15, 1999 (EP) .............................. 99204340

(51) Int. Cl.$^7$ .............................................. D02G 3/00
(52) U.S. Cl. ................. 428/361; 428/357; 428/383; 428/364; 428/371; 428/375; 428/376; 428/379; 428/397; 428/401; 428/407; 264/439; 264/443; 264/450; 264/459
(58) Field of Search ................... 428/383, 361, 428/357, 364, 371, 372, 375, 376, 377, 379, 397, 398, 401, 403, 407; 264/437, 439, 443, 450, 454, 459

(56) References Cited

U.S. PATENT DOCUMENTS

| | | | |
|---|---|---|---|
| 3,979,536 A | 9/1976 | Neville et al. | |
| 4,345,626 A | 8/1982 | Tolliver | |
| 5,089,326 A | 2/1992 | Bonazza | |
| 5,212,010 A | 5/1993 | Curzio et al. | |
| 5,236,529 A | 8/1993 | Ferrier et al. | |
| 5,998,028 A | * 12/1999 | Eckart et al. | |

FOREIGN PATENT DOCUMENTS

| | | |
|---|---|---|
| AT | 198914 | 8/1958 |
| EP | 0 109 505 | 5/1984 |
| EP | 0 234 463 | 9/1987 |
| EP | 0 335 588 | 10/1989 |
| EP | 0 392 904 | 10/1990 |
| EP | 0 546 962 | 6/1993 |
| EP | 0 758 693 | 2/1997 |
| EP | 0 940 277 | 9/1999 |
| FR | 1 290 278 | 3/1962 |
| FR | 2 708 294 | 2/1995 |
| GB | 957248 | 5/1964 |
| GB | 1174292 | 12/1969 |
| GB | 1374223 | 11/1974 |
| JP | 59-33046 | 2/1984 |
| WO | 99/10174 | 3/1999 |
| WO | 99/20682 | 4/1999 |

OTHER PUBLICATIONS

Database WPI, Section Ch, Week 197907, Derwent Publications Ltd., Class A94, AN 1979–12762B & JP 54–001357 A (Oji Gum Kasei KK), Jan. 8, 1979.

\* cited by examiner

*Primary Examiner*—Merrick Dixon
(74) *Attorney, Agent, or Firm*—Foley & Lardner

(57) ABSTRACT

The invention relates to a reinforcing structure (13), comprising metallic elements (15) (16), to be used to reinforce stiff composite articles (14) comprising such reinforcing structure and a polymer matrix. The reinforcing structure comprises metallic elements with structural deformations in order to improve the bending properties of the reinforcing structure and the impact properties of the stiff composite article, for which the reinforcing structure is used. The metallic elements run essentially parallel to each other.

20 Claims, 5 Drawing Sheets

REINFORCING STRUCTURE FOR STIFF COMPOSITE ARTICLES

FIELD OF THE INVENTION

The invention relates to a reinforcing structure, comprising metallic elements, and the use of such reinforcing structure to reinforce stiff composite articles. The invention further relates to stiff composite articles and a method to provide stiff composite articles.

BACKGROUND OF THE INVENTION

Reinforcing structure are known to reinforce polymer articles. Often, glass fibers or C-fibers are used to reinforce polymer matrices, providing together a reinforced, eventually shaped article. During forming processes, the bending properties of the polymer matrix are influenced negatively, since the reinforcing structures are difficult to elongate.

Often, metallic filaments or fibers are integrated into composite materials in order to obtain a material that is EMI shielded. As a result of electromagnetic requirements, metallic filaments or fibers with fine diameters of 100 μm or less are used. An example of this can be found in U.S. Pat. No. 5,089,326. It is known in the art that the addition of fine metallic fibers or filaments, usually less than 100 μm, does not increase the strength of the composite material.

Metal wires or metal wire textile fabrics are also known as reinforcing structures, e.g. from FR1290278, EP234463A1, EP546962A1 or EP392904A1. To improve the deformability of the composite material, metal wires are preferably provided as knitted fabrics.

SUMMARY OF THE INVENTION

The present invention relates to a reinforcing structure comprising metallic elements. The reinforcing structure can be used to manufacture stiff composite articles, which further comprises a polymer matrix.

It is an object of the present invention to provide a reinforcing structure which comprises metallic elements, all metallic elements laying essentially parallel to each other, which has improved bending properties compared to the known wires or wire meshes, and which provide an alternative to the knitted wire structures.

A reinforcing structure as subject of the invention comprises metallic elements, which are all essentially parallel to each other in the reinforcing structure, wherein each of the metallic elements are structurally deformed. By "essentially parallel, " it is meant that due to the nature of the metallic elements, the distance between adjacent metallic elements may vary only slightly.

In the scope of the present invention, metallic elements are to be understood as metallic wires, e.g. drawn metallic wires, a bundle of metallic wires, metallic strands or cords.

As subject of the invention, the bending properties of reinforcing structure are improved by integrating metallic elements in the reinforcing structure, which have an elongation at rupture of more than 3% compared to initial length. This elongation can even be more than 5% or more than 7%, e.g. more than 10% and most preferentially more than 15% at rupture.

According to the invention, this elongation is obtained by the use of a metallic element having structural deformations. Such structural deformation may have an irregular shape, e.g. undulated with a wavelength and/or amplitude, which varies over the length to the metallic element. Preferably however, the metallic element are undulated or spirally shaped in a regular way, with constant parameters over the whole length of the metallic element.

A structural deformation can be e.g. an undulation. The metallic element, being a wire, strand or cord, is given a form, characterized by a wavelength and an amplitude. This undulated metallic element is essentially comprehended in one plane, parallel to the axis of the metallic element. Another structural deformation can be that e.g. a metallic element has obtained a spiral shape, characterized by a diameter of the spiral and the length of the metallic element, necessary to make a 360° revolution in the spiral shape.

In case the metallic element is undulated, this undulation being the structural deformation, the removal of the structural deformation of the metallic element will lead to an elastic elongation, a plastic elongation, or a combination of both of the metallic element during the forming process, mainly depending on the wavelength of the undulation.

In case a small wavelength is used, e.g. less than 3 mm, a higher force will be necessary to elongate the metallic element, so removing the structural deformation, next to the elastic and plastic elongation of the metallic element under load as if there was no structural deformation. The removing of this structural deformation leads to a mainly plastic elongation of the metallic element. When the metallic element is released, the metallic element will not come back to its original undulated form, but will stay elongated to certain extend.

In case a longer wavelength is applied, e.g. more than 3 mm or even more than 4.5 mm, a lower force is sufficient to stretch the metallic element, so removing to some extend the structural deformation. This leads to a mainly elastic elongation of the metallic element, which is additional to the elastic elongation of the metallic element under low force as if there was no structural deformation. When the metallic element is released, the metallic element will come back to approximately its original undulated form. When higher forces are applied, a plastic elongation of the metallic element itself is found, next to the removal of the remaining structural deformation.

The elongation of the metallic elements being undulated with a large wavelength, can be more than 0.3%, e.g. more than 0.4%, or even more than 0.5%, preferably more than 1% or more, applying a force of 10% of the force at rupture of the metallic element.

In case the metallic element has a spiral shape structural deformation, an identical behavior is obtainable. Depending on the length to make a 360° rotation and the diameter of the spiral, the removal of the structural deformation of the metallic element will lead to an elastic elongation, a plastic elongation or a combination of both of the metallic element during the forming process.

One understands that the elongation due to a removing of the structural deformation, can be either elastic, or plastic or a combination of a plastic and an elastic elongation, depending on the wavelength or the length to make a 360° revolution applied.

Metallic elements, being part of a reinforcing structure as subject of the invention, may have more than one structural deformation, being e.g. undulations or spiral shape structural deformations, superposed one to another.

When a metallic element having two structural deformations, being two undulations of which one has a large wavelength and the second having a short wavelength, is subjected to an elongation force F, a stress-strain curve comprising different successive zones, limited by forces F1, F2, F3 and F4 (F1<F2<F3<F4), is obtained.

For a force F applied less than F1, an elastic elongation is obtained. When a force F larger than F1, but less than F2 is applied, an additional, essentially plastic elongation is added. These elongations can be explained by the mainly removing of the structural deformation with large wavelength.

When the force F is increased to a level between F2 and F3, the additional elongation again is mainly elastic. When F is increased to a level between F3 and F4, the elongation in this zone becomes mainly plastic, until rupture occurs at F4. These two later elongations are mainly explained by the removal of the structural deformation with short wavelength, and the plastic deformation of the metallic element without structural deformation until rupture.

The forces F1, F2 and F3, where the elongation change from elastic to plastic or vice versa, can be adjusted by the wavelength and amplitude of the undulations together with other parameters of the metallic element, such as diameter of wires, alloy and drawing history and eventually strand and cord construction.

In case more than 2 structural deformations are superposed to each other, a similar behavior of the metallic element under load can be obtained.

In case the structural deformations are undulations, the metallic element may either be undulated in one plane parallel to the axis of the metallic element, or the undulations may be provided in different planes, all parallel to the axis of the metallic element.

The same characteristics for metallic elements are found in case one or more structural deformations are spiral shaped structural deformations.

The reinforcing structure may comprise one or more layers, hereafter called reinforcing layers. According to the present invention, the metallic elements are present in at least one of the reinforcing layers, all metallic elements of this reinforcing layer are running essentially parallel to each other. In case the reinforcing structure comprises more than one reinforcing layer, of which at least two reinforcing layers comprise metallic elements, the direction of the metallic elements of one layer may be different of the direction of the other layer.

The reinforcing structure is to be understood as all elements, which are used to provide the stiff composite article, next to the polymer matrix. A person skilled in the art understands that also other materials can be used to provide elements of the reinforcing structure, e.g. glass fiber, C-fiber or mats or woven fabrics out of such materials, in addition to the metallic elements.

An object of the invention is to improve the bending properties and behavior of reinforcing structures comprising metallic elements during a forming process of a stiff composite article, comprising this reinforcing structure and a polymer matrix. During this process, the reinforcing structure and the polymer matrix are subjected to heat and/or pressure in order to obtain a stiff composite article. The forming can be done in one step or may require subsequent steps.

It was found that when a reinforcing structure comprising metallic elements, having a structural deformation, is subjected to a forming process, the force needed to form the stiff composite article is partially used to elongate the metallic element. The force applied will elongate the metallic element by partially removing the structural deformations. This is obtainable because of the elongation at rupture of the metallic elements as indicated above.

A reinforcing structure as subject of the invention may be subjected to a forming process, together with the polymer matrix. This process comprises a heating action to soften the polymer matrix, a forming action to form the softened matrix and the reinforcing structure in a desired form, and a cooling action to stiffen the matrix again.

When a metallic element having more than one structural deformation is used as a part of the reinforcing structure of a stiff composite article, benefits are provided to the bending properties during the forming process on the one hand and to the stiff composite article on the other hand. In case the force F, used to provide a stiff composite article comprising the reinforcing structure is approximately F2, the bending properties of the reinforcing structure are improved by the elastic and plastic elongation provided by the elongation zones below F2. However, when the stiff composite article is subjected to an impact force, e.g. a force between F2 and F3, the stiff composite article will be able to absorb the impact energy in a reversible change of its shape. This because mainly the reinforcing structure will stretched under an essentially elastic elongation.

Such forming processes, in which the reinforcing structure and the polymer matrix are subjected to heat and/or pressure in order to form a stiff composite article, may comprise one or subsequent steps.

First, polymer material, to be used as polymer matrix in the stiff composite article, is added to the reinforcing structure. E.g. several essentially parallel metallic elements are laminated between two or more polymer layers. Eventually, other elements of the reinforcing structure are added before or during laminating. An alternative is to extrude polymer material around the reinforcing structure, comprising the metallic elements, which are essentially parallel to each other. This combination of polymer material and reinforcing structure comprising metallic elements is subjected to a forming process.

Such a forming process could be e.g. press-forming, flow moulding, thermofolding or membrane forming.

In a press-forming operation (stamping), a reinforcing structure and the polymer matrix are heated to processing temperature and stamped to shape in a two-part-tool under pressure to provide a stiff composite article.

In a flow moulding operation, the reinforcing structure and the polymer matrix are placed in a two-part-tool and heated to the melting temperature of the polymer material. Eventually pressure is used. The mould cavity is filled by polymer matrix, flowing into every recess of the mould, so providing a stiff composite article.

In a thermofolding operation the reinforcing structure and the polymer matrix are heated locally and folded to provide a stiff composite article. In a membrane forming operation an autoclave pressure is used to drape the preheated reinforcing structure and the polymer matrix over a tool, providing a stiff composite article.

Further, the presence of metallic elements in the matrix during bending operations improves the heat distribution throughout the whole matrix. Since the metallic elements have a high thermal and electric conductivity. This leads to shorter cycle times compared to composite materials with other reinforcing structures, not comprising metallic elements such as glass fibers or carbon fibers.

It is also obvious that, when metallic elements are used in only one direction of the reinforcing structure, the structural deformations of the metallic elements will lead to an improvement of the bending properties of the reinforcing structure only in the direction parallel to the axis of the metallic element.

In case metallic elements are used in more than one direction each direction present in a different reinforcing layer of the reinforcing structure, the structural deformation of the metallic elements will lead to an improvement of the bending properties in all directions parallel to an axis of a metallic element.

The metallic elements can be woven or braided together with polymer filaments, yarns or polymer tapes into one and the same fabric. The metallic elements run in only one direction of the fabric, either the warp or weft direction. This fabric itself forms part of the reinforcing structure. It provides an alternative way to introduce the metallic elements into the polymer matrix. Polymer material, to be used as the polymer matrix of the stiff composite material itself, is added, e.g. extruded on one or on both sides of the fabric. Alternatively, the fabric may be laminated with one or more layers of polymer material. When such a combination of a fabric comprising metallic elements and polymer material is subjected to a forming process, in order to obtain a stiff composite article, the polymer filaments or yarns help to fill the spaces between the adjacent metallic elements. Especially when the filaments or yams are of the same polymer nature as compared to the polymer matrix.

Another alternative is provided by providing a polymer coating around the metallic elements, preferably before they are given the structural deformation. E.g. polymer material is extruded around the metallic element. Such polymer coating helps to improve the adhesion between the metallic elements of the reinforcing structure and the polymer matrix.

Any stiff thermoplastic material can be used as a polymer matrix. A thermoplastic material has to be considered as any thermoplast and any thermoplastic elastomer.

Examples of suitable thermoplastic materials are: polyethylene (PE), polypropylene (PP), polystyrene (PS), polyethylene terephthalate (PET), polyethylene napthalate (PEN), polybuteen terephthalate (PBT) polyvinylchloride (PVC), polyamide (PA), polyester (PES), polyimide (PI), polycarbonate (PC), styrene acrilonitryl (SAN), acrylonitril-butadiene-styrene (ABS), thermoplastic polyurethane (TPU), thermoplastic polyolefins (TPO), thermoplastic copolyetheresters, copolymers of these polymers or similar materials.

These polymer matrices could be defined by a Young's modulus of more than $10^7$ Pa, preferably between $10^8$ Pa and $5*10^9$ Pa. The Young's modulus is measured at the origin of the stress-strain curve of the polymer at ambient temperatures.

A similar stiff composite article can be obtained by using thermoset polymers by forming the reinforcing structure without polymer matrix, and adding the thermoset matrix, being the polymer matrix, to the formed reinforcing structure by e.g. injection molding.

In case metallic elements, being strands or cords, are used in the reinforcing structure, either as such or integrated into a woven or braided fabric together with polymer filaments, yarns or tapes, preference is to be given to those strands or cords, which have a large and rough surface so as to increase the mechanical anchoring in the matrix. Examples are 3×3 and 7×3 cords, preferred to single stranded cords.

To improve the corrosion resistance of the metallic elements, the metallic elements can be coated with a metallic coating layer such as zinc or a zinc alloy such as brass. A suitable zinc alloy is an alloy comprising 2 to 10% Al and 0.1 to 0.4% of a rare earth element such as La and/or Ce.

In order to assure a good adhesion between the metallic and the thermoplastic material, an adhesion promoter can be applied on the metallic element.

Possible adhesion promoters are bifunctional coupling agents such as silane compounds. One functional group of these coupling agents is responsible for the binding with the metal or metal oxides; the other functional group reacts with the polymer.

More details about these coupling agents can be found in the PCT application WO-A-99/20682.

Other suitable adhesion promoters are aluminates, zirconates or titanates.

Wires used as metallic elements as such or comprised in a strand or cord may have various cross-sections and geometries, e.g. circular, oval or flat.

Within the range of wires, strands and cords, a large variety of materials can be used, dependent on the required mechanical strength. Wires used as such or comprised in a strand or cord, can have a diameter of 0.04 mm to 1.0 mm, preferably between 0.1 mm and 0.4 mm, e.g. 0.15 mm, 0.175 mm or 0.3 mm.

Wires having structural deformations, may also be used to provide a strand or cord. These strands or cords may form part of the reinforcing structure.

Any metal can be used to provide the metallic elements. Preferably alloys such as high carbon steel alloys or stainless steel alloys are used.

When steel wire is used, the tensile strength of the steel wires ranges from 1500 N/mm$^2$ to 3000 N/mm$^2$ and even more, and is mainly dependent upon the composition of the steel and the diameter.

Also other parameters of a strand or cord, such as the construction of the strand or cord, the number of wires and the diameters of each wire comprised in a strand or cord, the force at rupture of each wire comprised in the strand or cord, can be chosen to provide the required mechanical properties such as strength and elongation at rupture.

BRIEF DESCRIPTION OF THE DRAWINGS

The invention will now be described into more detail with reference to the accompanying drawings wherein FIGS. 1A and B shows a schematic view of a stiff planar composite structure as subject of the invention.

DESCRIPTION OF THE PREFERRED EMBODIMENTS OF THE INVENTION

Figure 1A:
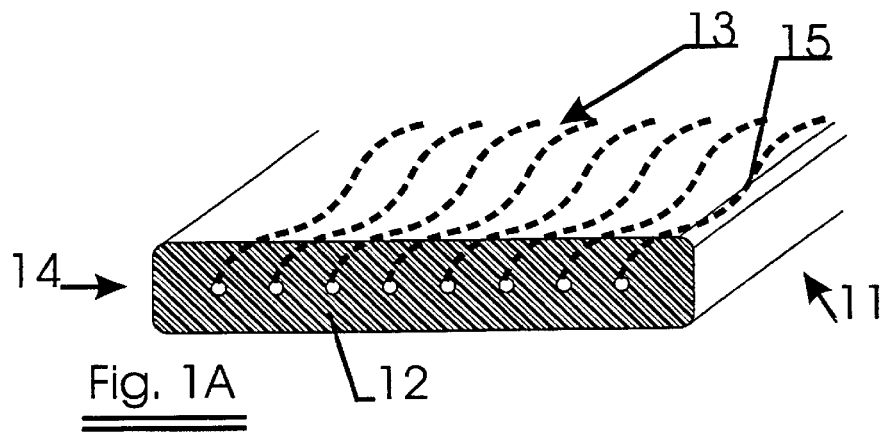
Figure 1B:
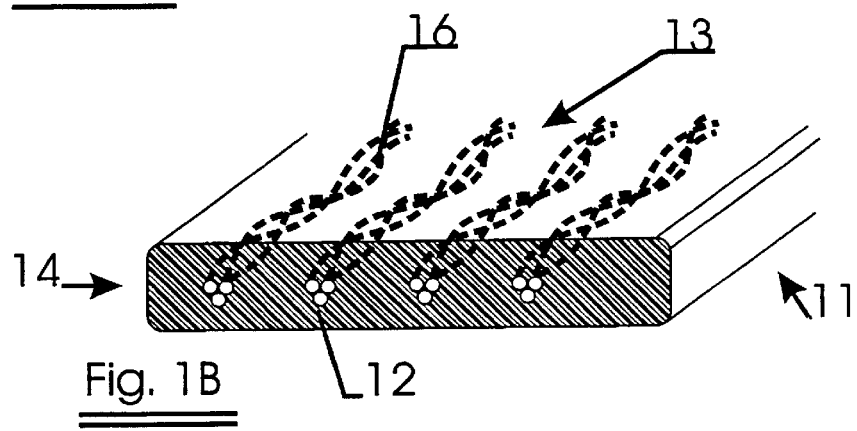

An embodiment of a stiff planar composite material is shown in FIGS. 1A and 1B. The stiff planar composite material 11 comprises a polymer matrix 12, e.g. a PES matrix, and a reinforcing structure 13, comprising only one reinforcing layer 14. In this embodiments the reinforcing layer 14 consists of a number of undulated wires 15, laying essentially parallel to each other in one reinforcing layer (as shown in FIG. 1A) or a number of undulated wires 16, laying essentially parallel to each other in one reinforcing layer (as shown in FIG. 1B).

Figure 2:
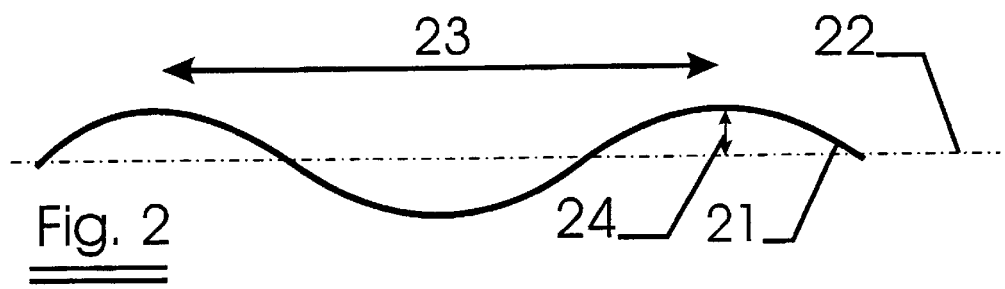
FIG. 2 shows a side view of an undulated wire.

FIG. 2 shows a side view of an undulated wire 21. The wire has its original axis 22, to which it is undulated in one plane with a wavelength 23 and amplitude 24. For this embodiment, a wire diameter of 0.3 mm is chosen.

Different embodiments of an undulated wire were provided, having characteristics as shown in the table underneath.

| Sample | Wire diameter | Wavelength | amplitude |
| --- | --- | --- | --- |
| Sample A | 0.3 mm | 6.199 mm | 0.867 mm |
| Sample B | 0.3 mm | 5.579 mm | 0.964 mm |
| Sample C | 0.3 mm | 2.988 mm | 0.696 mm |
| Sample D | 0.3 mm | 0 mm | 0 mm |

All other characteristics are identical for the four samples. Sample A, B and C were provided using the wire of sample D.

Figure 3:
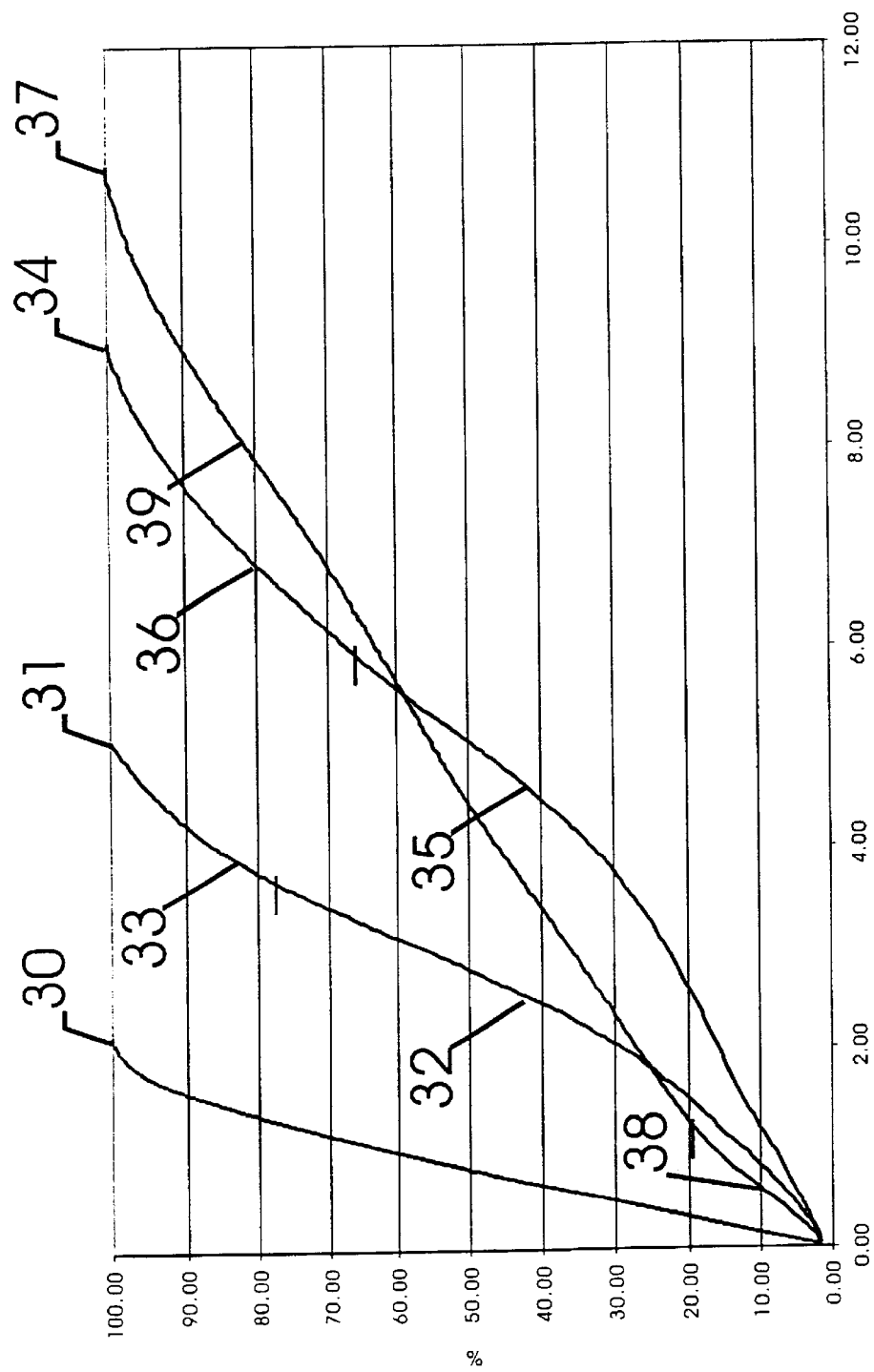
FIG. 3 shows stress strain curves of undulated wires.

FIG. 3 shows the stress strain curves of sample A, B, C and D. In abscissa, the elongation compared to the length at start is shown. The ordinate shows the force applied compared to the total force at rupture.

Compared to the curve 30 of the not structural deformed wire of sample D, it is clear that by introducing a structural deformation, a significant larger elongation is obtainable. Since this structural deformation is the only difference between the four samples, the different elongation has to be caused by the structural deformation.

For sample A, the stress strain curve 31 shows that the major part of the elongation is found in the essentially elastic deformation zone 32 of the curve, whereas only a smaller part of the elongation is found in the plastic deformation zone 33.

Same observation can be made for the stress-strain curve 34 of sample B. A major part of the elongation is found in the elastic deformation zone 35, compared to the elongation provided by the plastic deformation zone 36. Both samples have a rather large wavelength and it was found that the removal of the structural deformation was obtained by an essentially elastic elongation.

For sample C, the stress-strain curve 37 shows that only a small elastic elongation can be found in the elastic deformation zone 38, compared to the large elongation in the plastic deformation zone 39. The removing of the structural deformation for these rather short wavelengths is essentially obtained by a plastic elongation.

Elongation more than 4%, e.g. 5%, 9% or even 11% are obtained. At 10% of the force at rupture, already a large elongation is found for metallic element with structural deformation compared to the elongation at 10% of force at rupture of a not structural deformed wire. This elongation at low forces is improved using large wavelengths.

Other embodiments can be obtained by applying different undulated wires such as wires with other diameter, alloy, wavelength, amplitude or undulation forms. Even cords and strands, being undulated, e.g. parallel to the strand or cord axis are to be understood in the scope of the invention.

Figure 4:
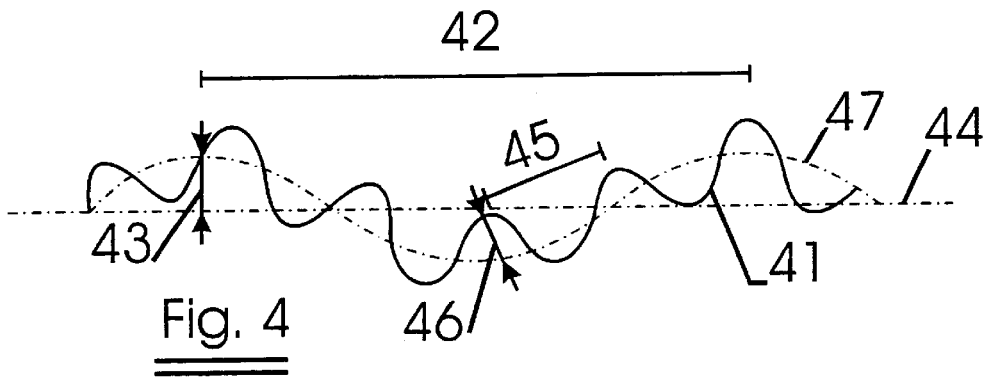
FIG. 4 shows a metallic element, having two undulations superposed to each other.

Another embodiment is obtainable using metallic element with more than one structural deformation superposed to each other. In FIG. 4 a wire 41 is shown, having 2 undulations superposed to each other. The two undulations are provided in the same plane.

A first undulation, characterized with a large wavelength 42 and amplitude 43, compared to the axis 44 of the wire as if there was no such undulation, is superposed to an undulation with short wavelength 45 and amplitude 46 compared to the axis 47 of the wire as if there was no such undulation.

An embodiment was provided with characteristics as in the table underneath:

| Sample | Wire diameter | Wavelength 42 | Amplitude 43 | Wavelength 45 | Amplitude 46 |
| --- | --- | --- | --- | --- | --- |
| Sample E | 0.3 mm | 5.034 mm | 1.124 mm | 2.988 mm | 0.696 mm |

Figure 5:
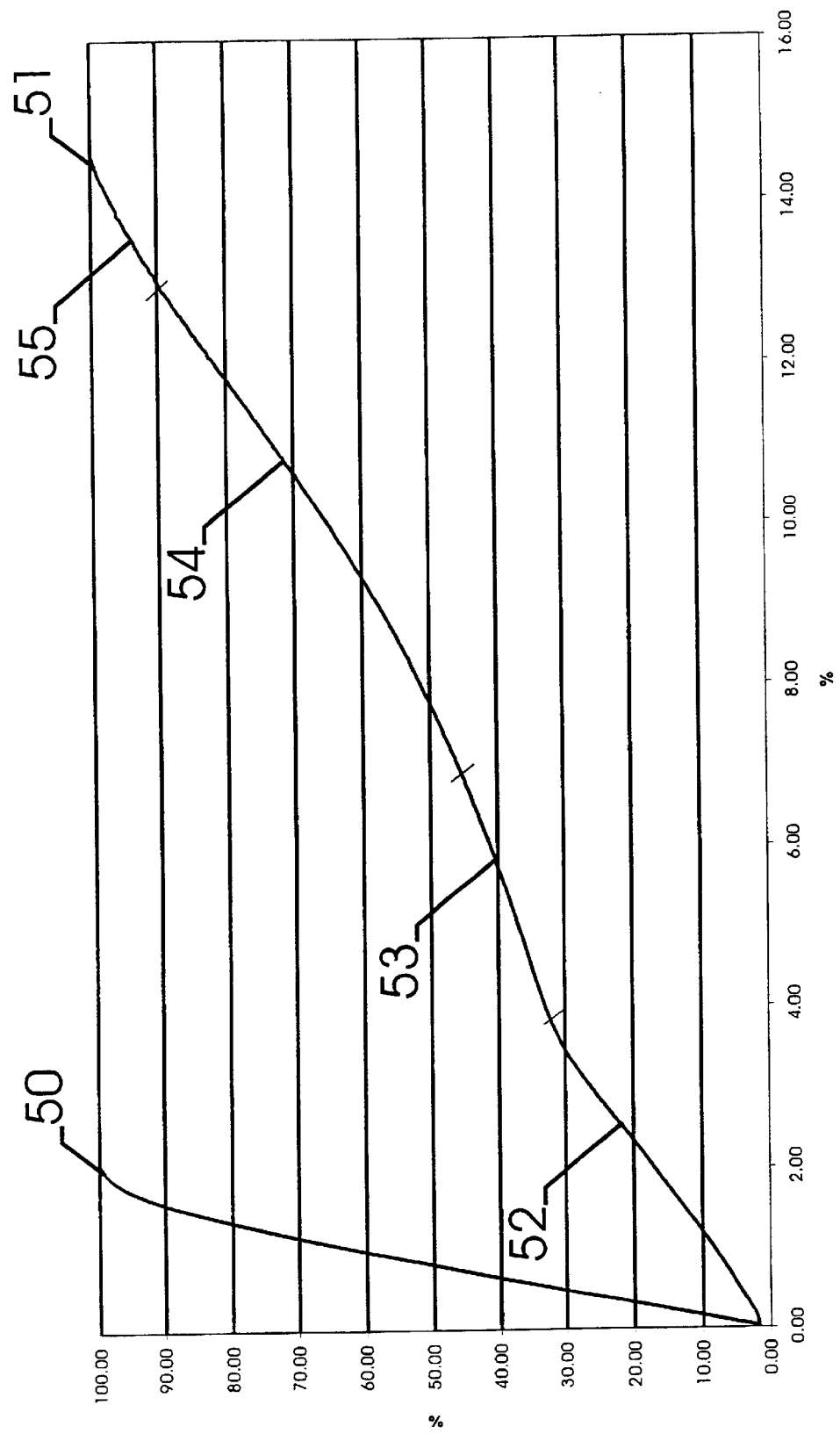
FIG. 5 shows a stress-strain curve of an undulated wire as shown in FIG. 4.

FIG. 5 shows the stress strain curves of sample E. In abscissa, the elongation compared to the length at start is shown. The ordinate shows the force applied compared to the total force at rupture.

Compared to the curve 50 of the not structural deformed wire of sample D, it is clear that by introducing structural deformations, a significant larger elongation is obtainable. Since this structural deformation is the only difference between sample E and the reference wire sample D, the different elongation has to be caused by the structural deformation.

For sample E, curve 51 shows 4 zones. In zone 52, the elongation obtained is essentially elastic. Zone 53 provided an additional elongation which is mainly plastic, whereas zone 54 provides an elongation which is again more elastic. Zone 55 provides a plastic elongation until rupture occurs.

Figure 6:
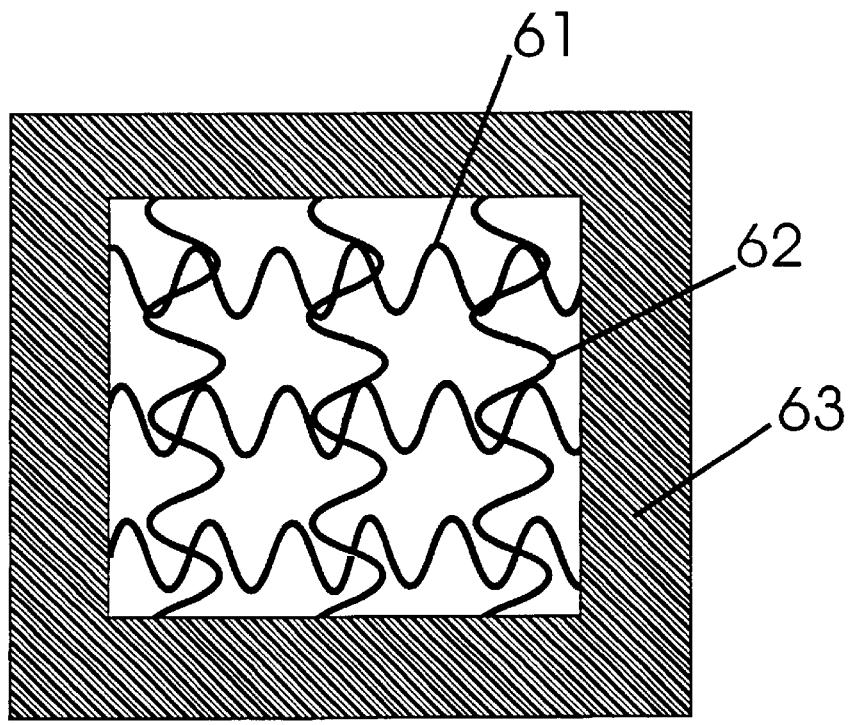
FIGS. 6, 7 and 8 shows a schematic view of another stiff planar composite structure as subject of the invention.

A reinforcing structure having 2 reinforcing layers is shown in FIG. 6. In the first reinforcing layer, undulated wires 61 are laying essentially parallel to each other in one direction. In the second reinforcing layer undulated wires 62 are laying essentially parallel to each other in a direction, which is different from the direction of the wires 61 of the first reinforcing layer.

A stiff composite article may be obtained when a polymer matrix 63 is provided to the reinforcing structure, e.g. by laminating polymer sheets under increased temperature to both sides of the reinforcing structure.

By applying heat and/or pressure, the polymer matrix 63 adheres to the reinforcing structure. Possibly, the stiff composite article is given its final form at the same time. Alternatively, a planar stiff composite article is provided, which may be deformed to a final shape later in a separate operation applying heat and/or pressure to the planar stiff composite article.

Figure 7:
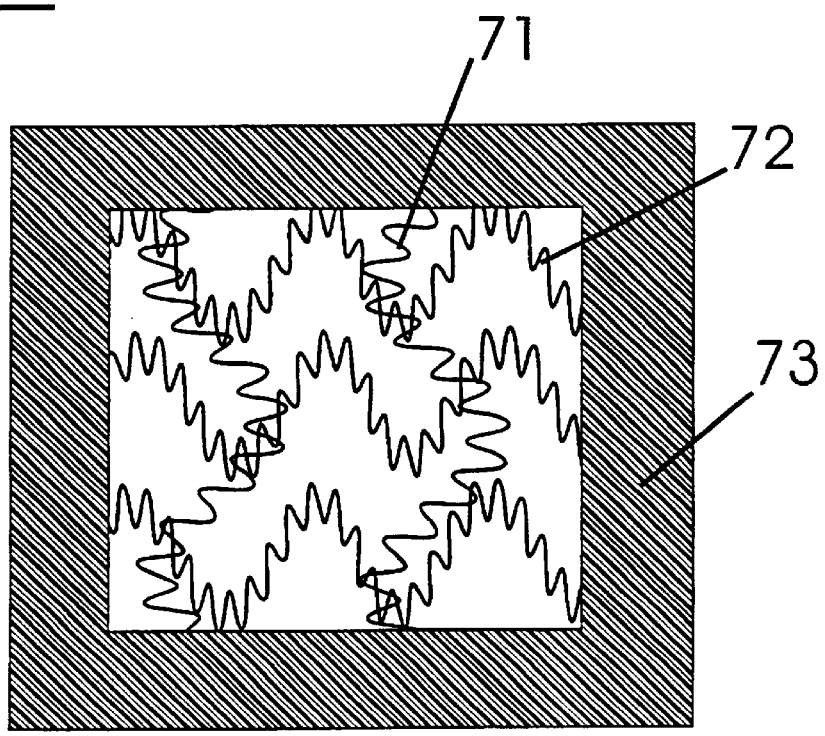

Another reinforcing structure is shown in FIG. 7. Wires 71 and 72, each having two undulations superposed to each other, are arranged in two reinforcing layers. In each reinforcing layer, the wires 71, respectively 72 are laying essentially parallel to each other. The directions of wires 71 and 72 may be different. A polymer matrix 73 is additionally provided and adheres via heat and/or pressure tot he reinforcing structure, so providing a planar stiff composite article.

Figure 8:
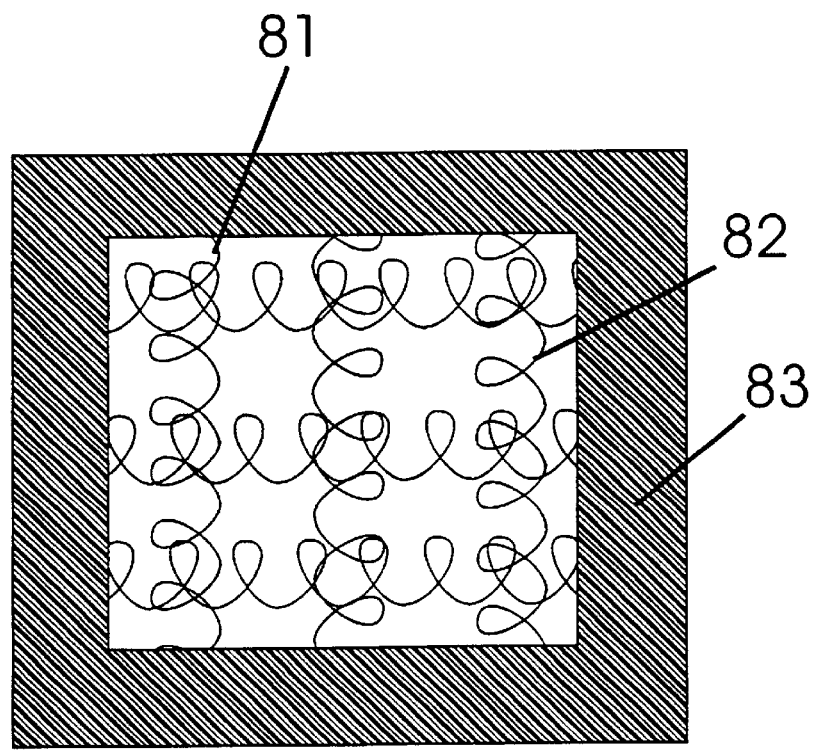

Another reinforcing structure having 2 reinforcing layers is shown in FIG. 8. In the first reinforcing layer, spirally shaped wires 81 are laying essentially parallel to each other in one direction. In the second reinforcing layer spirally shaped wires 82 are laying essentially parallel to each other in a direction, which is different from the direction of the wires 81 of the first reinforcing layer. A polymer matrix 83 is additionally provided and adheres via heat and/or pressure to the reinforcing structure, so providing a planar stiff composite article.

Figure 9:
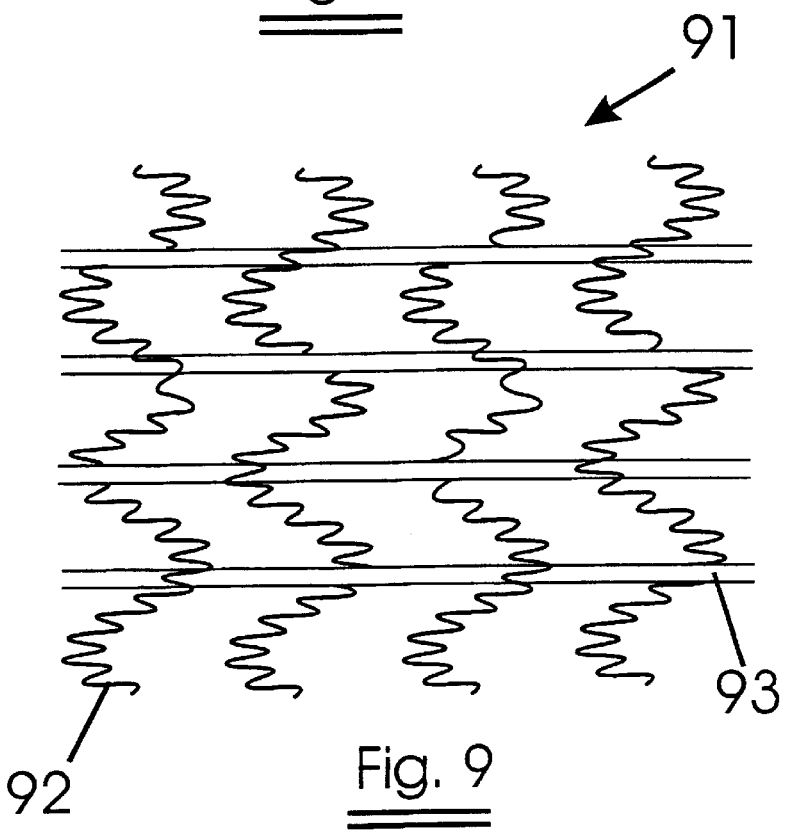
FIG. 9 shows a reinforcing structure comprising a textile woven fabric.

Another reinforcing structure, being a textile woven fabric 91 is shown in FIG. 9, comprising undulated wires as metallic element 92. Metallic elements 92 are present in warp or weft direction on the woven fabric, whereas the other direction of the woven fabric, being the weft respectively the warp, is provided using polymer filaments 93. These filaments may be made from the same or a different polymer as the polymer matrix of the stiff composite article. Alternatively, the polymer filament may be replaced by polymer tapes, having a width preferably in the range of 1 to 10 mm, and a thickness preferably between 20 and 300 $\mu$m. Alternatively, some polymer material can be present as coating on the metallic elements or on a number of metallic elements to form strips. The total volume of the thermoplastic material present as filament and/or as coating may even be more than 40% of the total volume of the woven fabric.

A reinforcing structure may comprise one or more reinforcing layers, each layer being such a textile fabric as described above.

For all embodiments, it was found that the adhesion between metallic element and polymer matrix could be influenced by a coating of the metallic element. For PA-matrices, a brass, zinc or zinc alloy coating on the metallic element can improve the adhesion between polymer matrix and metallic element. A possible zinc alloy is an alloy comprising 2 to 10% Al and 0.1 to 0.4% of a rare earth element such as La and/or Ce.

Further improvement for the adhesion can be obtained by applying adhesion promoters such as silane compounds, aluminates, zirconates or titanates.

It is clear that other embodiments are obtained by using other polymer matrices such as PE, PP, PS, PET, PEN, PBT, PVC, PA, PI, PC, SAN, ABS, TPU, TPO, thermoplastic copolyetheresters, copolymers of these polymers or similar materials. Each of the embodiments are influenced in a similar way as far as the coatings or the use of adhesion promoters is concerned.

A person known in the art understands that for all embodiments, the alloy type of the metal used, the diameters, section shapes and other physical properties of the wires, strands or cords will influence the strength of the metallic element.

It is clear that all metallic elements have an undulated structure, or have a rough structure, which improves the mechanical anchoring of the polymer material round the metallic element.

What is claimed is:

1. A reinforcing structure, comprising:
   one or more reinforcing layers, wherein at least one of said reinforcing layers comprises metallic elements, wherein said metallic elements are wires, bundles of wires, metallic strands or metallic cords, wherein all of said metallic elements of said reinforcing layer are essentially parallel to each other, and wherein said metallic elements have at least one structural deformation.

2. A reinforcing structure as in claim 1, wherein said metallic elements have 2 structural deformations.

3. A reinforcing structure as in claim 1, where at least one of said structural deformations is an undulation.

4. A reinforcing structure as in claim 1, where at least one of said structural deformations is a spirally shaped structural deformation.

5. A reinforcing structure as in claim 1, wherein said structural deformations are undulations.

6. A reinforcing structure as in claim 4, wherein said undulations are comprised in one plane, parallel to the axis of said metallic element.

7. A reinforcing structure as in claim 5, wherein said undulations are comprised in different planes, said planes are parallel to the axis of said metallic element.

8. A reinforcing structure as in claim 1, wherein said metallic elements comprise one or more metallic wires, said metallic wires have a diameter in the range of 0.04 to 1 mm.

9. A reinforcing structure as in claim 1, wherein said metallic elements are wires.

10. A reinforcing structure as in claim 1, wherein said metallic elements are cords.

11. A reinforcing structure as in claim 1, where said metallic elements have an elongation at rupture of more than 3%.

12. A reinforcing structure as in claim 1, where said metallic elements have an elongation of more than 0.3% at a force of 10% compared to the force at rupture of said metallic elements.

13. A reinforcing structure as in claim 1, wherein said reinforcing layer which comprises said metallic elements is a textile woven fabric, consisting of a warp and a weft, and wherein said metallic elements are present in either warp or weft.

14. A reinforcing structure as in claim 1, wherein said metallic elements have a polymer coating.

15. The use of a reinforcing structure as in claim 1, to provide a stiff composite article, said stiff composite article comprising said reinforcing structure and a polymer matrix.

16. A method of manufacturing a stiff composite article comprising:
   providing a reinforcing structure as in claim 1;
   adding a polymer matrix to the reinforcing structure; and
   forming said stiff composite article by applying heat and/or pressure to said reinforcing structure and said polymer matrix.

17. A method of manufacturing a stiff composite article comprising:
   providing a reinforcing structure as in claim 1;
   adding a polymer matrix to the reinforcing structure;
   applying heat to soften said polymer matrix;
   applying a force to said reinforcing structure and softened polymer matrix to obtain a stiff composite article; and
   cooling said stiff composite article.

18. A stiff composite article obtainable by applying at least one of heat and pressure to a polymer matrix and a reinforcing structure as in claim 1.

19. A reinforcing structure as in claim 1, wherein said reinforcing layer which comprises said metallic elements is a textile woven fabric, comprising a warp and a weft, and wherein said metallic elements are present in either warp or weft.

20. A method of manufacturing a stiff composite article by applying at least one of heat and pressure to a polymer matrix and a reinforcing structure as in claim 1.

* * * * *

UNITED STATES PATENT AND TRADEMARK OFFICE
CERTIFICATE OF CORRECTION

PATENT NO.         : 6,777,081 B2                                              Page 1 of 1
APPLICATION NO.    : 10/149595
DATED              : August 17, 2004
INVENTOR(S)        : Boesman et al.

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 29 days Delete the phrase "by 29 days" and insert -- by 0 days--

Signed and Sealed this

Twenty-eighth Day of November, 2006

JON W. DUDAS
*Director of the United States Patent and Trademark Office*